(12) United States Patent
Tokuda et al.

(10) Patent No.: US 6,655,651 B2
(45) Date of Patent: Dec. 2, 2003

(54) TWO-PORT VALVE

(75) Inventors: Tetsuro Tokuda, Tsukuba-gun (JP); Hiroaki Suzuki, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 37 days.

(21) Appl. No.: 09/802,915

(22) Filed: Mar. 12, 2001

(65) Prior Publication Data

US 2001/0023929 A1 Sep. 27, 2001

(30) Foreign Application Priority Data

Mar. 27, 2000 (JP) .................................. 2000-086922

(51) Int. Cl.$^7$ .............................................. F16K 31/122
(52) U.S. Cl. ...................................................... 251/63.6
(58) Field of Search ............................ 251/63, 63.5, 63.6

(56) References Cited

U.S. PATENT DOCUMENTS

| | | | | | |
|---|---|---|---|---|---|
| 2,634,754 A | * | 4/1953 | Rahn | ........................ | 251/63 X |
| 3,224,817 A | * | 12/1965 | Miller et al. | ................ | 277/439 |
| 3,542,332 A | | 11/1970 | Chevalier | | |
| 3,955,796 A | * | 5/1976 | Grove | ........................ | 251/172 |
| 3,970,280 A | | 7/1976 | Kunz | | |
| 4,257,442 A | * | 3/1981 | Claycomb | ................ | 251/333 X |
| 4,355,784 A | * | 10/1982 | Cain | ............................ | 251/63 |
| 5,762,316 A | * | 6/1998 | Barnett | ....................... | 251/63.5 |

FOREIGN PATENT DOCUMENTS

| | | |
|---|---|---|
| DE | 9704262 | 2/1997 |
| EP | 1 114 955 | 7/2001 |
| FR | 865659 | 5/1941 |
| GB | 234206 | 5/1925 |

* cited by examiner

*Primary Examiner*—Gene Mancene
*Assistant Examiner*—Eric Keasel
(74) *Attorney, Agent, or Firm*—Oblon, Spivak, McClelland, Maier & Neustadt, P.C.

(57) ABSTRACT

An input port 2 and an output port 3 opening in orientations at 90° from each other are connected by a flow path 4, a valve seat 7 formed around an input-side connecting hole 5 can be opened and closed from inside the flow path 4 by a valve body 8 provided to a tip end of a valve shaft 9 for moving forward and rearward by operation of fluid pressure, the valve body 8 moves across a front of an output-side connecting hole 6 in opening and closing of the valve seat 7, a diameter of the valve shaft 9 is formed to be equal to or slightly larger than that of the valve body 8, and a stroke of the valve body 8 for opening and closing the valve seat 7 is set at an amount required to fully open the output-side connecting hole 6.

8 Claims, 3 Drawing Sheets

TWO-PORT VALVE

TECHNICAL FIELD

The present invention relates to a two-port valve suitable for use in a duct for fluid including foreign matter.

PRIOR ART

In a two-port valve in which a valve seat formed inside and around a connecting hole on an input port side is opened and closed by a valve body facing the valve seat to come in contact with and separate from the valve seat in a casing, it is possible to increase a size of a flow path section. However, if the two-port valve is used in a duct for fluid including a large amount of foreign matter such as refuse, the foreign matter gets tangled with the valve body or a valve shaft or builds up in a portion of the flow path, which may make the two-port valve unusable. Therefore, a ball valve or the like which can prevent the foreign matter from getting tangled is used in the duct for the fluid including the large amount of foreign matter but the ball valve or the like is relatively expensive. Therefore, development of a product by which the foreign matter can be prevented from getting tangled or building up by an inexpensive pilot-type two-port valve or the like is desired.

DISCLOSURE OF THE INVENTION

The present invention has been accomplished for development of such a product. Therefore, it is basically a technical object of the invention to provide an inexpensive two-port valve with a simple structure in which foreign matter does not get tangled with a valve body or a valve shaft or does not build up in a portion of a flow path when the two-port valve is used in a duct for fluid including a large amount of foreign matter such as refuse.

It is another technical object of the invention to provide a two-port valve in which the valve body can be easily inserted and detached from outside a casing and which has excellent assembling property, disassembling property, and maintainability of the valve body which is liable to be damaged by the foreign matter such as refuse.

To achieve the above objects, a two-port valve of the invention comprises: an input port and an output port provided in a tip end face and a side face of a casing in orientations at 90° from each other; a flow path for connecting both the ports; an input-side connecting hole for connecting the input port to the flow path; an output-side connecting hole for connecting the output port to the flow path; an annular valve seat formed around the input-side connecting hole; a valve body for opening and closing the valve seat from an inside of the flow path; and a valve shaft in a circular-cylindrical shape inserted for forward and rearward movements in a sealed state into a sliding hole in the casing, having a tip end portion facing the inside of the flow path, having the valve body at the tip end portion, and for operating such that the valve body moves across the output-side connecting hole in opening and closing of the valve seat by the valve body, wherein the valve shaft has a diameter equal to or slightly larger than that of the valve body and a stroke of the valve body for opening and closing the valve seat is an amount required to fully open the output-side connecting hole.

In the two-port valve having the above structure, a flow path section can be set at a sufficiently large size but the opening and closing stroke of the valve body is set at the amount required to fully open the output-side connecting hole. Therefore, the flow path extending from the input port to reach the output port in the casing becomes a maximum size when the valve is open and a vortex-shaped flow is suppressed. If the two-port valve is used in the duct for fluid including a large amount of foreign matter such as refuse, the foreign matter does not build up in the flow path.

Furthermore, because the diameter of the valve shaft projecting and sinking from and into the casing into and from the flow path is set to be equal to or slightly larger than the diameter of the valve body, a stagnation portion or a portion where the foreign matter gets tangled with the valve body is not generated in the flow path in the casing, which also prevents the foreign matter from building up in the flow path.

Because the two-port valve is formed by structurally modifying a conventionally known pilot-type valve, the two-port valve has the simple structure and can be provided at a low price as compared with a ball valve or the like conventionally used for fluid including the foreign matter.

According to a concrete embodiment of the invention, the input-side connecting hole and the output-side connecting hole respectively have sizes similar to those of the input port and the output port and a length of the flow path in an axial direction of the valve shaft is similar to a diameter of the output-side connecting hole in the axial direction.

The valve body and the valve shaft may be formed separately or connected to each other or may be formed integrally.

According to another concrete embodiment of the invention, the sliding hole is formed to extend from a rear end face of the casing to reach the flow path, the valve shaft is inserted into the sliding hole from a rear end face side of the casing, a cover is detachably mounted to the rear end face of the casing, a piston for operating by operation of pilot fluid pressure is housed in the cover, the valve shaft is connected to the piston, and the valve shaft and the valve body can be mounted into and detached from the sliding hole from the rear end face side of the casing in a state in which the cover is detached.

If the valve shaft and the valve body can be inserted and detached into and from the sliding hole from outside the casing as described above, an assembling property, a disassembling property, and maintainability of the valve body which is liable to be damaged by the foreign matter such as refuse become excellent.

It is preferable that a scraper for suppressing entering of foreign matter from the flow path into the sliding hole is provided in a position of the sliding hole close to an end portion on a flow path side.

DETAILED DESCRIPTION

Figure 1:
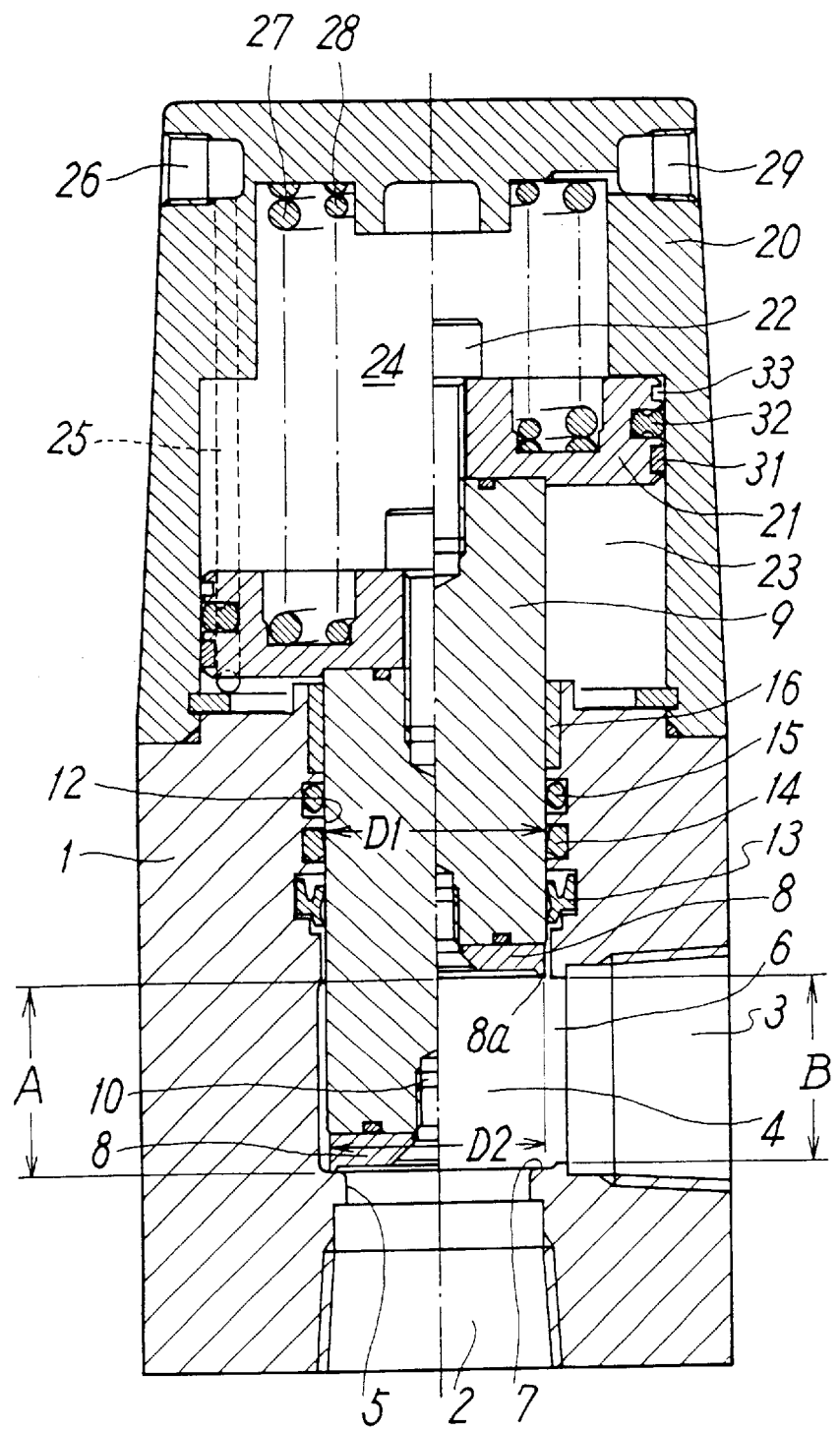
FIG. 1 is a vertical sectional view showing a left half of a first embodiment of the two-port valve according to the present invention in a closed state of the valve and showing a right half in an open state of the valve.

FIG. 1 shows an embodiment of a two-port valve according to the invention. This two-port valve is mainly suitable for use in a state in which the valve is connected to a duct for liquid including a large amount of foreign matter such as refuse and abatement of a machine tool.

The valve of the embodiment is a pilot-type two-port valve and has a casing 1 having a rectangular or circular section. The casing 1 has an input port 2 which opens in an axial one end face of the casing 1 and an output port 3 which opens in such a direction as to be orthogonal to an axis of the casing 1 in a side face of the casing 1. In the casing 1, an L-shaped flow path 4 which communicates with the input port 2 and the output port 3 respectively through connecting holes 5 and 6 is formed. The connecting holes 5 and 6 are formed to have cross-sectional areas similar to those of the respective ports 2 and 3 in such a manner that the cross-sectional areas of the connecting holes 5 and 6 are substantially equal to or slightly smaller than those of the corresponding ports 2 and 3.

In the casing 1, an annular valve seat 7 is formed around the input-side connecting hole 5 connecting the input port 2 and the flow path 4 and a valve body 8 for opening and closing the valve seat 7 from a flow path 4 side is disposed. The valve body 8 is mounted to a tip end of a valve shaft 9 in a circular-cylindrical shape which is supported for sliding in the casing 1 and driven by pilot fluid pressure (air pressure). The input port 2, input-side connecting hole 5, valve body 8, and valve shaft 9 are disposed on the same axis.

By providing the L-shaped flow path 4 in the casing 1, upsizing the input-side connecting hole 5 to a size similar to the input port 2, and providing the valve seat 7 around the connecting hole 5 such that the valve seat 7 is opened and closed by the valve body 8 as described above, a flow path section in the casing 1 is set to be sufficiently large and a flow path in which a vortex-shaped flow is suppressed is formed.

Figure 2:
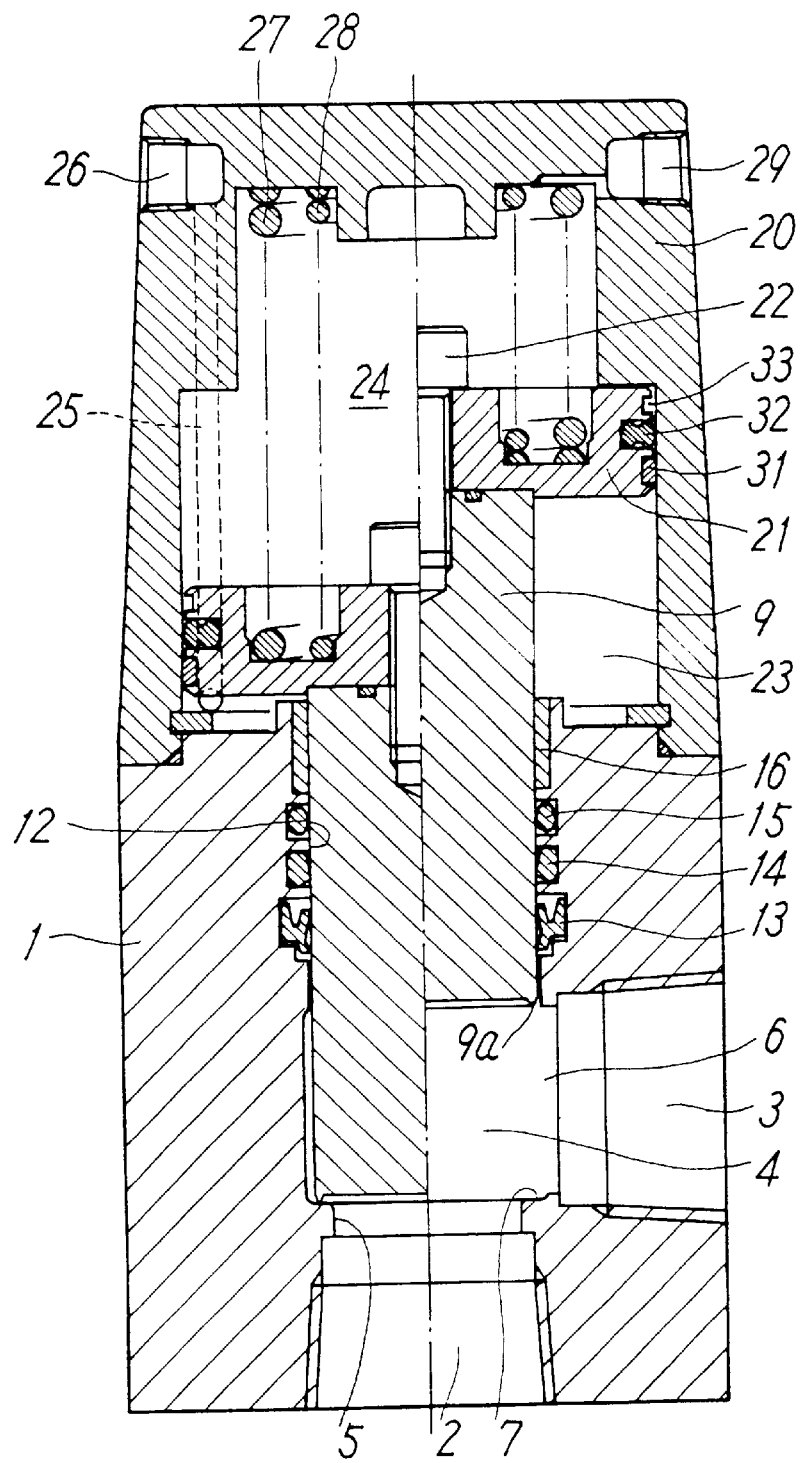
FIG. 2 is a vertical sectional view showing a left half of a second embodiment of the invention in a closed state of the valve and showing a right half in an open state of the valve.

The valve shaft 9 having at the tip end thereof the valve body 8 is inserted for sliding in a liquid-tight state into a sliding hole 12 provided to the casing 1 and a tip end portion of the valve shaft 9 projects and sinks into and from the flow path 4. On the other hand, the valve body 8 has at a periphery thereof an annular valve sealing portion 8a which comes in contact with and separates from the valve seat 7. The valve body 8 is mounted to the tip end of the valve shaft 9 through a bolt 10 and the valve body 8 moves across a front face of the output-side connecting hole 6 in opening and closing of the valve seat 7 by the valve body 8. Because the valve body 8 may be damaged by foreign matter such as refuse, it is preferable that the valve body 8 can be changed by means of the bolt 10. However, the valve body 8 is not necessarily exchangeable and it is possible that the valve body 8 is integrated with the valve shaft 9 and that a valve sealing portion 9a is formed around the tip end of the valve shaft 9 as shown in an embodiment in FIG. 2, for example.

The sliding hole 12 into which the valve shaft 9 is fitted is formed to extend from a rear end face of the casing 1 to reach the flow path 4 and the valve shaft 9 is inserted into the sliding hole 12 from the rear end face side of the casing 1. In order to prevent the foreign matter from entering between the sliding hole 12 and the valve shaft 9 and to simultaneously seal the sliding hole 12 and the valve shaft 9, a scraper 13 for suppressing entering of the foreign matter from the flow path is provided to a position of the sliding hole 12 close to the flow path 4. Behind the scraper 13, a sealant 14 for sealing against liquid entering from the flow path and a sealant 15 for sealing against pilot fluid pressure from a pressure chamber 23 which will be described below are provided.

In the drawings, a reference numeral 16 designates a guide bushing.

The valve shaft 9 in the embodiment in FIG. 1 has a diameter D1 equal to or slightly larger than a diameter D2 of the valve body 8. In the embodiment in FIG. 2, the valve body is not provided with a special reference numeral because the valve body is integrated with the valve shaft 9 but the diameters of the valve shaft 9 and the valve body are substantially the same. A stroke A of the valve body 8 for opening and closing the valve seat 7 is set at an amount required to substantially fully open the output-side connecting hole 6 of the output port 3 in the flow path 4. In other words, the stroke A of the valve shaft 9 is set at such an amount as to move the valve body 8 rearward to a position completely off the output-side connecting hole 6 in opening of the valve seat 7.

Figure 3:
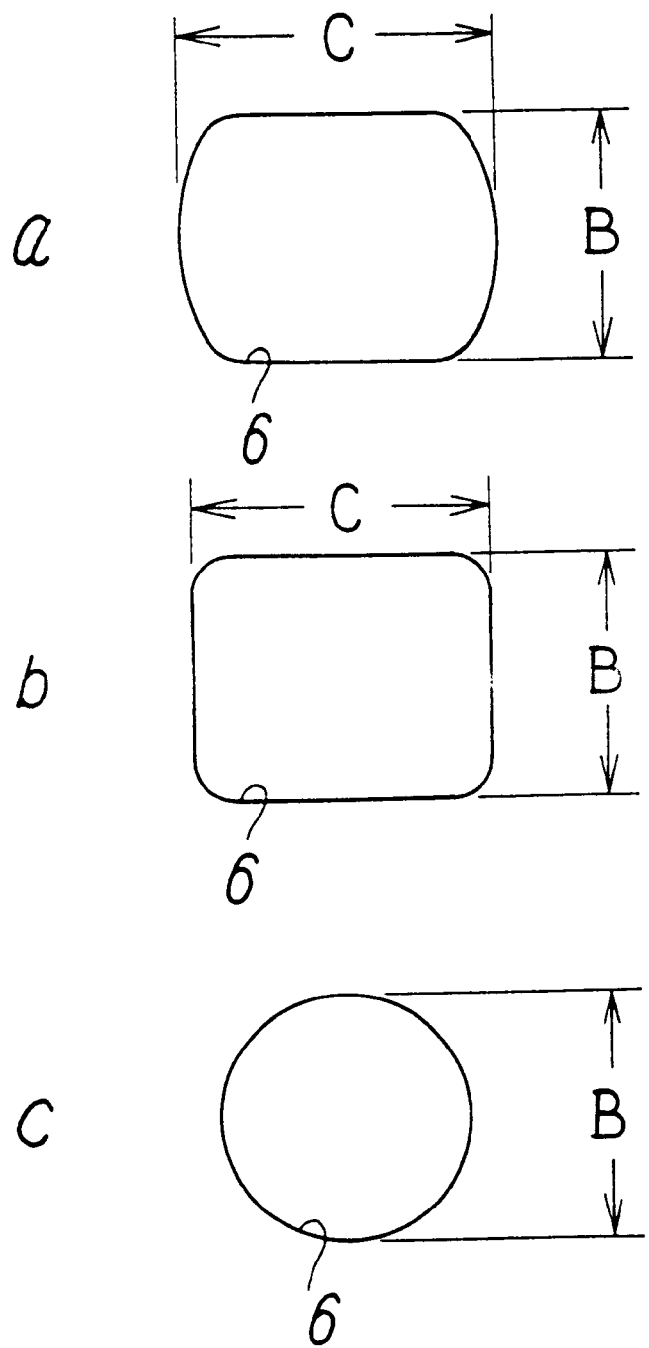
FIGS. 3a to 3c are explanatory views showing examples of a shape of an output-side connecting hole 6 of an output port 3.

FIGS. 3a to 3c show examples of a preferable shape of the output-side connecting hole 6. Shapes of the output-side connecting hole 6 shown in FIGS. 3a and 3b are rectangles or shapes similar to the rectangles and have widths C substantially equal to or larger than the diameter of the valve body 8 or the valve shaft 9. By forming the output-side connecting hole 6 into such a shape, a flow path section can be made as large as possible.

Because a length of the flow path 4 in an axial direction of the valve shaft is set at an amount similar to a diameter B of the output-side connecting hole 6 in the axial direction, i.e., a height B in such a manner that the length of the flow path 4 is substantially the same as or slightly larger than the height B in the embodiments shown in the drawings, there is a relationship, A≈B between the stroke A (FIG. 1) for fully opening the valve body 8 and the height B of the output-side connecting hole 6. An inside diameter of the flow path 4 is formed to be slightly larger than a diameter of the valve shaft 9 such that the valve shaft 9 is fitted in the flow path 4 with a small gap around the valve shaft 9.

If the diameter D1 of the valve shaft 9 is set to be equal to or slightly larger than the diameter D2 of the valve body 8 as described above and the valve body is moved to such a position that the output-side connecting hole 6 of the output port 3 is fully open, the valve body 8 substantially sinks into the sliding hole 12 of the casing 1 in an open state of the valve, a section of the flow path from the input port 2 to the output port 3 becomes a maximum size, and generation of the vortex-shaped flow is suppressed. Therefore, the foreign matter does not build up in a portion of the flow path 4.

Because the diameter of the valve shaft 9 projecting and sinking from and into the sliding hole 12 into and from the flow path 4 is set to be equal to or slightly larger than the diameter of the valve body 8 such that there is hardly a gap between the valve body 8 and the sliding hole 12, a stagnation portion or a portion where the foreign matter gets tangled with the valve body 8 is not generated in a portion of the flow path 4 in the casing 1, which also prevents the foreign matter from building up in the flow path.

In order to drive the valve shaft 9 with the pilot fluid pressure, a cover 20 is detachably mounted to a rear end portion of the casing 1, a cylinder portion is formed in the cover 20, and a piston 21 is housed for sliding in the cylinder portion. A rear end portion of the valve shaft 9 extends from the sliding hole 12 into the cylinder portion and connected to the piston 21 through a bolt 22. The pressure chamber 23 and a spring chamber 24 are defined and formed on opposite sides of the piston 21 and the pressure chamber 23 communicates with a pilot port 26 through a pilot through hole 25.

First and second springs 27 and 28 are disposed between the cover 20 and a recessed portion of the piston in the spring chamber 24 and the spring chamber 25 is open to an outside through a breathing port 29.

If the cylinder portion is formed in the cover 20 detachably mounted onto the casing 1 and the valve body 8 is formed to have the diameter equal to or smaller than that of the valve shaft 9 as described above, it is possible to insert and detach the valve shaft 9 and the valve body 8 into and from the sliding hole 12 from outside the casing 1 in a state in which the cover 20 is detached and an assembling property, a disassembling property, and a maintainability of the valve body 8 which is liable to be damaged by the foreign matter such as refuse are excellent.

Around the piston 21, a guide ring 31, packing 32, and a groove 33 filled with grease to oil the packing are provided.

In the two-port valve with the above structure, in a state in which the pilot fluid pressure is not supplied from the pilot port 26 to the pressure chamber 23, the valve sealing portion 8a (9b in the embodiment in FIG. 2) of the valve body 8 is pressed against the valve seat 7 by biasing forces of the first and second springs 27 and 28 acting on the piston 21 to close the flow path 4.

If the pilot fluid pressure is supplied to the pressure chamber 23 through the pilot port 26 in this state, the piston 21 is driven against the biasing forces of the first and second springs 27 and 28 and the valve seat 7 is opened.

At this time, because the stroke A of the valve body 8 for opening and closing the valve seat 7 is set to be equal to the stroke required to substantially fully open the output-side connecting hole 6 connecting the output port 3 and the flow path 4, i.e., the height B of the output-side connecting hole 6, the flow path extending from the input port 2 to reach the output port 3 in the casing 1 achieves a maximum size when the valve is open and the vortex-shaped flow is suppressed. Therefore, if the two-port valve is used in a duct for fluid including a large amount of foreign matter such as refuse, the foreign matter does not build up in the flow path.

Furthermore, because the diameter D1 of the valve shaft 9 projecting and sinking from and into the casing 1 into and from the flow path 4 is set to be equal to or slightly larger than the diameter D2 of the valve body 8, the stagnation portion or the portion where the foreign matter gets tangled with the valve body is not generated in the flow path 4 in the casing 1, which also prevents the foreign matter from building up in the flow path.

Because the two-port valve is formed by structurally modifying a conventionally known pilot-type valve, the two-port valve has the simple structure and can be provided at a low price as compared with a ball valve or the like conventionally used for fluid including foreign matter.

Because there is substantially no difference between the embodiment in FIG. 2 and the embodiment in FIG. 1 except for the structure and operation especially described above by reference to FIG. 2, the same reference numerals as those in FIG. 1 are provided to omit description of the embodiment in FIG. 2.

According to the pilot-type two-port valve of the invention which has been described above in detail, it is possible to provide the inexpensive two-port valve having a simple structure in which the foreign matter dose not get tangled with the valve body or the valve shaft or does not build up in a portion of the flow path if the two-port valve is used in the duct for fluid including the large amount of foreign matter such as refuse.

According to the invention, it is possible to provide the two-port valve in which the valve body can be easily inserted and detached from outside the casing to thereby improve the assembling property, the disassembling property, and the maintainability of the valve body which is liable to be damaged by the foreign matter such as refuse.

What is claimed is:

1. A two-port valve comprising:

a casing having an input port in a tip end face of said casing and an output port in a side face of said casing at substantially 90° from each other;

a flow path connecting said input and output ports;

an input-side connecting hole connecting said input port to said flow path;

an output-side connecting hole connecting said output port to said flow path;

an annular valve seat formed around said input-side connecting hole;

a valve body configured to open and close said annular valve seat from an inside of said flow path and having a valve sealing portion at a tip end face of the valve body; and a valve shaft connected to said valve body and configured to move forward and rearward in a substantially sealed state in said casing such that said valve body is moved across said output-side connecting hole in opening and closing of said annular valve seat with said valve body;

wherein said valve shaft has a diameter equal to a diameter of said valve body, and said valve body opens and closes said valve seat with a stroke which is substantially equal to a diameter of the output-side connecting hole such that said valve sealing portion moves out of said flow path when said output-side connecting hole is fully opened to said flow path, and wherein the annular valve seat and the output-side connecting hole are positioned substantially orthogonal and adjacent to each other.

2. A two-port valve according to claim 1, wherein said valve body and aid valve shaft are formed integrally.

3. A two-part valve according to claim 1, wherein said valve body and said valve shaft are formed separately and detachably connected to each other.

4. A two-port valve according to claim 1, wherein said casing has a sliding hole formed therein and extending from a rear end face of said casing to said flow path, said valve shaft is inserted into said sliding hole from a rear end face side of said casing, a cover is detachably mounted to said rear end face of said casing, a piston which is operated by pilot fluid pressure is housed in said cover, said valve shaft is connected to said piston, and said valve shaft and said valve body is slidably mounted in said sliding hole from said rear end face side of said casing.

5. A two-port valve according to claim 4, wherein a scraper configured to suppress foreign matter from entering from said flow path into said sliding hole is positioned in said sliding hole close to an end portion on a flow path side.

6. A two-port valve according to claim 1, wherein said input-side connecting hole and said output-side connecting hole respectively have sizes substantially similar to those of said input port and said output port and a length of said flow path in an axial direction of said valve shaft is similar to the diameter of said output-side connecting hole in said axial direction.

7. A two-port valve according to claim 6, wherein said casing has a sliding hole formed therein and extending from a rear end face of said casing to said flow path, said valve shaft is inserted into said sliding hole from a rear end face side of said casing, a cover is detachably mounted to said rear end face of said casing, a piston which is operated by pilot fluid pressure is housed in said cover, said valve shaft is connected to said piston, and said valve shaft and said valve body is slidably mounted in said sliding hole from said rear end face side of said casing.

8. A two-port valve according to claim 7, wherein a scraper configured to suppress foreign matter from entering from said flow path into said sliding hole is positioned in said sliding hole close to an end portion on a flow path side.

* * * * *